US009664352B2

(12) United States Patent
Scheibner et al.

(10) Patent No.: US 9,664,352 B2
(45) Date of Patent: May 30, 2017

(54) HEADLIGHT LENS FOR A VEHICLE HEADLIGHT

(71) Applicant: DOCTER OPTICS SE, Neustadt an der Orla (DE)

(72) Inventors: Hans Scheibner, Neustadt (DE); Mohsen Mozaffari-Afshar, Gera (DE)

(73) Assignee: Docter Optics SE, Neustadt an der Orla (DE)

( * ) Notice: Subject to any disclaimer, the term of this patent is extended or adjusted under 35 U.S.C. 154(b) by 201 days.

(21) Appl. No.: 14/437,729

(22) PCT Filed: Aug. 14, 2013

(86) PCT No.: PCT/EP2013/002437
§ 371 (c)(1),
(2) Date: Apr. 22, 2015

(87) PCT Pub. No.: WO2014/072003
PCT Pub. Date: May 15, 2014

(65) Prior Publication Data
US 2015/0300587 A1    Oct. 22, 2015

(30) Foreign Application Priority Data

Nov. 8, 2012 (DE) .................. 10 2012 021 797
Nov. 16, 2012 (DE) .................. 10 2012 022 402

(51) Int. Cl.
*F21S 8/10* (2006.01)
*F21W 101/10* (2006.01)
*F21Y 115/10* (2016.01)

(52) U.S. Cl.
CPC ......... *F21S 48/125* (2013.01); *F21S 48/1159* (2013.01); *F21S 48/1241* (2013.01);
(Continued)

(58) Field of Classification Search
CPC  F21S 48/1159; F21S 48/1241; F21Y 2101/02
See application file for complete search history.

(56) References Cited

U.S. PATENT DOCUMENTS

2007/0120137 A1    5/2007   Wilson et al.

FOREIGN PATENT DOCUMENTS

DE    4320554      12/1993
DE    10252228     8/2003
(Continued)

OTHER PUBLICATIONS

International Search Report and Written Opinion, Application No. PCT/EP2013/002437, dated Jan. 21, 2014.
(Continued)

*Primary Examiner* — Elmito Breval
(74) *Attorney, Agent, or Firm* — Barnes & Thornburg LLP (57) ABSTRACT

The invention relates to a headlight lens for a vehicle headlight, in particular for a motor vehicle headlight, wherein the headlight lens has an, in particular blank-pressed, integral body which is composed of a transparent material and has at least one light entry surface and has at least one optically active light exit surface, characterized in that the integral body comprises a light tunnel which merges with a bend in a light conduction part for forming the bend as a light/dark boundary, wherein the radiation power of the light which enters the headlight lens through the light entry surface and exits from the light exit surface (for forming the bend as a light/dark boundary) is at least 80% of the radiation power of the light which enters the headlight lens through the light entry surface.

34 Claims, 4 Drawing Sheets

(52) U.S. Cl.
CPC ...... *F21S 48/1291* (2013.01); *F21W 2101/10* (2013.01); *F21Y 2115/10* (2016.08)

(56) References Cited

FOREIGN PATENT DOCUMENTS

| | | |
|---|---|---|
| DE | 102004005931 | 8/2004 |
| DE | 102005009556 | 9/2005 |
| DE | 102004043706 | 4/2006 |
| DE | 102007052696 | 7/2008 |
| DE | 102011118277 | 9/2010 |
| EP | 1630576 | 3/2006 |
| EP | 1514148 | 1/2008 |
| EP | 1903275 | 3/2008 |
| EP | 2390561 | 11/2011 |
| WO | 2009109209 | 9/2009 |
| WO | 2012072188 | 6/2012 |
| WO | 2012072191 | 6/2012 |
| WO | 2012072192 | 6/2012 |
| WO | 2012072193 | 6/2012 |

OTHER PUBLICATIONS

Office Action issued on Jun. 27, 2013 in German Application No. 102012021797.8.
International Preliminary Report on Patentability, Application No. PCT/EP2013/002437, dated May 12, 2015.
English translation of International Preliminary Report on Patentability, Application No. PCT/EP2013/002437, dated May 12, 2015.

HEADLIGHT LENS FOR A VEHICLE HEADLIGHT

CROSS REFERENCE TO RELATED APPLICATIONS

This application is a U.S. nationalization under 35 U.S.C. §371 of International Application No. PCT/EP2013/002437, filed Aug. 14, 2013, which claims priority to German Application No. 102012021797.8, filed Nov. 8, 2012 and German Application No. 102012022402.8, filed Nov. 16, 2012.

FIELD OF THE INVENTION

The invention refers to a headlight lens for a vehicle headlight, in particular for a motor vehicle headlight, wherein the headlight lens includes a monolithic body of transparent material, including at least one light entry face and at least one optically effective light exit face.

BACKGROUND INFORMATION

WO 2012/072188 A1 discloses a headlight lens for a motor vehicle headlight, wherein the headlight lens includes a body of transparent material, including at least one (in particular optically effective light entry face and at least one optically effective light exit face, and wherein the body comprises a light tunnel which, via a bend, forms a transition into a light passage section for imaging the bend as a bright-dark-boundary

SUMMARY

The invention relates to a headlight lens for a vehicle headlight, in particular for a motor vehicle headlight, wherein the headlight lens includes a optionally press-molded, in particular monolithic body of transparent material, including at least one (in particular optically effective or operative) light entry face and at least one optically effective (operative) light exit face, wherein the particularly monolithic body comprises a light tunnel which, via a bend, forms a transition into a light passage section (of the particularly monolithic body) for imaging the bend as a bright-dark-boundary, wherein a first straight line intersects a second straight line at an angle ($\alpha$), which angle, when looking at that headlight lens in which the light passage section lies to the right of the light tunnel, amounts to 1° up to 10°, optionally $\phi$3° up to 7°, for example to roughly 5°, all viewed in the clockwise direction starting from the first straight line, wherein the first straight line is the optical axis or an optical axis, respectively, of the light passage section and/or the optical axis or an optical axis, respectively, of the light exit face and/or the projection of the optical axis or an optical axis, respectively, of the light passage section onto a vertical plane and/or the projection of the optical axis or an optical axis, respectively, of the light exit face onto the vertical plane, and wherein the second straight line is the optical axis or an optical axis, respectively, of the light tunnel and/or the projection of the optical axis or an optical axis, respectively, of the light tunnel onto the vertical plane.

In this context, it is particularly provided for that the radiant flux of the light which enters the headlight lens through the light entry face and exits from the light exit face (for imaging the bend as a bright-dark-boundary), amounts to at least 80%, in particular to at least 88%, for example up to 95% of the radiant flux of the light which enters the headlight lens through the light entry face.

The invention further relates to a headlight lens for a vehicle headlight, in particular for a motor vehicle headlight, wherein the headlight lens includes a optionally press-molded, in particular monolithic body of transparent material, including at least one (for example optically effective) light entry face and at least one optically effective light exit face, wherein the particularly monolithic body comprises a light tunnel which, via a bend, forms a transition into a light passage section (of the optionally monolithic body) for imaging the bend as a bright-dark-boundary, wherein the light tunnel comprises an area on its surface which corresponds essentially to part of the surface of an ellipsoid, wherein a first straight line intersects a second straight line by an angle (a), which angle, when looking at that headlight lens in which the light passage section lies to the right of the light tunnel, amounts to 1° up to 10°, optionally to 3° up to 7°, for example to about 5°, when viewed in a clockwise direction starting from the first straight line, wherein the first straight line is the optical axis or an optical axis, respectively, of the light passage section and/or the optical axis or an optical axis, respectively, of the light exit face and/or the projection of the optical axis or an optical axis, respectively, of the light and passage section onto the vertical plane and/or the projection of the optical axis or an optical axis, respectively, of the light exit face onto the vertical plane, and wherein the second straight line is the optical axis or an optical axis, respectively, of the light tunnel and/or a straight line through the two focal points of the ellipsoid and/or the projection of the optical axis or an optical axis, respectively, of the light tunnel onto the vertical plane and/or the projection of a straight line through the two focal points of the ellipsoid onto the vertical plane.

In this context, it is, e.g., provided for that the radiant flux of the light which enters the headlight lens through the light entry face and exits from the light exit face (for imaging the bend as a bright-dark-boundary) amounts to at least 80%, in particular to at least 88%, optionally up to 95% of the radiant flux of the light which enters the headlight lens through the light entry face.

The invention relates to a headlight (headlamp) lens for a vehicle headlight, in particular for a motor vehicle headlight, wherein the headlight lens includes a optionally press-molded, in particular monolithic body of transparent material, including at least one (for example optically effective) light entry face and at least one optically effective light exit face, wherein the particularly monolithic body comprises a light tunnel which, via a bend, forms a transition into a light passage section (of the particularly monolithic body) for imaging the bend as a bright-dark-boundary, wherein the radiant flux of the light which enters the headlight lens through the light entry face and exits from the light exit face (for imaging the bend as a bright-dark-boundary) amounts to at least 80%, in particular at least 88%, for example up to 95% of the radiant flux of the light which enters the headlight lens through the light entry face.

An optically effective (or operative) light entry (sur-)face and/or an optically effective (operative) light exit (sur-)face, respectively, is/are an optically effective (operative) surface of the monolithic body. In the sense of the invention, an optically effective (or operative) surface is, in particular, a surface of the transparent body, at which surface, when using the headlight lens according to its purpose, the light will be refracted. In the sense of the invention, an optically effective (operative) surface is, in particular, a surface at which, when using the headlight lens according to its purpose, the direction of light which passes through this surface will be changed.

In the sense of the invention, transparent material is in particular glass. Transparent material, in the sense of the invention, is optionally inorganic glass. In the sense of the invention, transparent material is optionally silicate glass. In the sense of the invention, transparent material is optionally glass as described in PCT/EP2008/010136. In the sense of the invention, glass optionally comprises 0.2 to 2% by weight $Al_2O_3$,
0.1 to 1% by weight $Li_2O$,
0.3, for example 0.4 to 1.5% by weight $Sb_2O_3$,
60 to 75% by weight $SiO_2$,
3 to 12% by weight $Na_2O$,
3 to 12% by weight $K_2O$, and
3 to 12% by weight CaO.

In the sense of the invention, the term press-molding[i] is, in particular, to be understood in a manner that an optically effective (operative) surface is subjected to pressure such that any subsequent finishing or post-treatment of the contour of this optically effective surface may be dispensed with, or does not apply, or will not have to be provided for, respectively. Consequently, it is particularly provided for that, after press-molding, the press-molded surface will not be ground, (i.e. it will not [have to] be treated by grinding).

In the sense of the invention, a light tunnel is, in particular, characterized in that essentially total reflection will occur at its lateral (in particular top, bottom, right and/or left) surfaces, so that light entering the light entry face is conducted through the tunnel acting as a light guide (conductor). In the sense of the invention, a light tunnel is in particular a light guide or light conductor. In particular, it is provided for that total reflection will occur at the longitudinal surfaces of the light tunnel. In particular, it is provided for that the longitudinal surfaces of the light tunnel are intended for total reflection. In particular, it is provided for that total reflection will be achieved along the surfaces of the light tunnel essentially oriented in the direction of the optical axis of the light tunnel. In particular, it is provided for that the surfaces of the light tunnel essentially oriented in the direction of the optical axis of the light tunnel are destined for total reflection. A light tunnel, in the sense of the invention, will, advantageously, taper in the direction towards its light entry face. A light tunnel, in the sense of the invention, will, advantageously, taper in the direction towards its light entry face by at least 3°. A light tunnel, in the sense of the invention, will, advantageously, taper in the direction of its light entry face by at least 3° with respect to its optical axis. A light tunnel, in the sense of the invention, will, advantageously, taper at least partially in the direction towards its light entry face. A light tunnel, in the sense of the invention, will, favourably taper at least partially in the direction of its light entry face by at least 3°. A light tunnel, in the sense of the invention, will, advantageously, taper at least partially in the direction of its light entry face by at least 3° with respect to its optical axis. A light tunnel, in the sense of the invention, is, for example, no glass fibre, fibre glass or fibre optics. A light tunnel, in the sense of the invention, is, for example, dimensionally stable. In the sense of the invention, a light tunnel is, for example, not flexible. Supplementally, plural light tunnels may be provided for as well, as described in WO 2012/072188 A1 (cf. FIGS. 15, 16, and 17 of WO 2012/072188 A1) or claimed therein, respectively.

[i] translator's remark: also termed bright-pressing, blank-molding or blank-pressing in technical and patent literature A bend, in the sense of the invention, is, in particular, a curved transition. A bend, in the sense of the invention, is, for example, a curved transition having a radius of curvature of no less than 50 nm. For example, it is provided for that the surface of the headlight lens has no break or discontinuity in the bend, but rather a curve or curvature. In particular, it is provided for that the surface of the headlight lens in the bend has a curvature, in particular, with a radius of curvature of the curve in the bend of no less than 50 nm. In an embodiment, the radius of curvature is no larger than 5 mm. In an embodiment, the radius of curvature is no more than 0.25 mm, for example, no more than 0.15 mm, advantageously no more than 0.1 mm. In a further embodiment of the invention, the radius of curvature of the curve in the bend is at least 0.05 mm. For example, it is provided for that the surface of the headlight lens is press-molded in the region of the bend.

Figure 7:
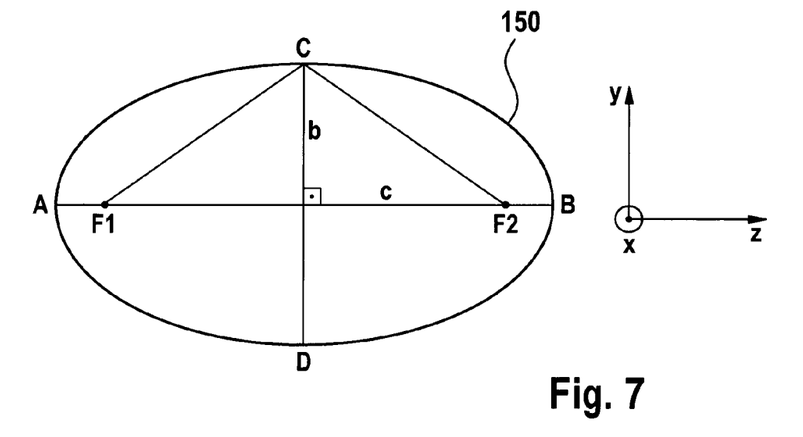
FIG. 7 shows an example of embodiment of an ellipsoid.
Figure 8:
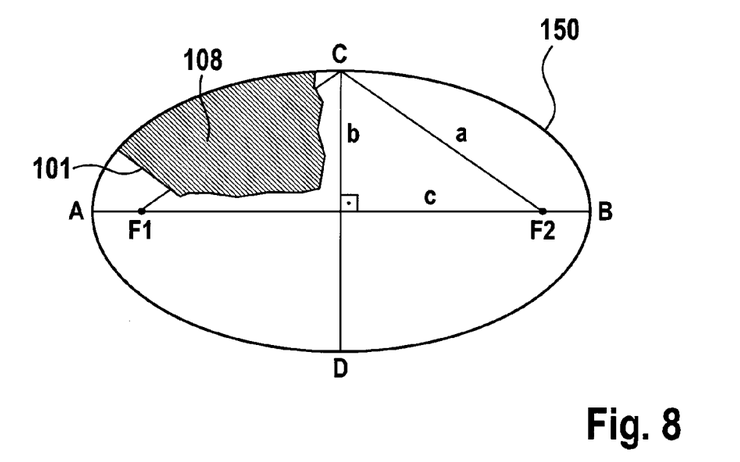
FIG. 8 shows the ellipsoid according to FIG. 7 with a superimposing representation of a portion of the light tunnel represented in FIG. 6 by way of a cross sectional representation.

In the sense of the invention, a vertical plane is, for example, a plane in the direction of the optical axis of the light exit face and/or of the optical axis of the light passage section. The focal points of the ellipsoid, in the sense of the invention, are the focuses thereof. The points F1 and F2 in FIG. 7 and FIG. 8 are to be taken as examples for the focal points of an ellipsoid.

In an embodiment of the invention, the point of intersection of the first straight line with the second straight line is provided for (arranged) in the bend and/or in the transition from the light tunnel to the light passage section.

In a further embodiment of the invention, the light tunnel includes, between an ellipsoid-configured region and the light passage section, a transitional area, in which the surface (of the light tunnel) restricting the light tunnel in an upward direction rises in the direction towards the light passage section, and/or in which area the surface (of the light tunnel) restricting the light tunnel in an upward direction has a point of inflection, and/or in which area the surface (of the light tunnel) restricting the light tunnel in an upward direction has a concavely curved region, for example having a radius of curvature of at least 10 mm, having a radius of curvature of at least 20 mm. The transition from the ellipsoid-configured region of the surface restricting the light tunnel upwardly into the transitional area may occur by means of a press-molded bend.

In a further embodiment of the invention, the light exit face is segmented. In a further embodiment of the invention, the light exit face comprises at least three segments, which, in particular, are separated from one another by means of an indentation, of a notch, or by a bend.

In a further embodiment of the invention, the light tunnel is arranged between the bend and the light entry face. In a further embodiment of the invention, the light passage section is arranged between the bend and the light exit face. It is, for example, provided for that light entering the transparent body through the light entry face and entering the passage section from the light tunnel in the region of the bend, will exit from the light exit face at an angle of between −30° and 30° with respect to the optical axis. It is, for example, provided for that light entering the transparent body through the light entry face, will exit from the light exit face at an angle of between −30° and 30° relative to the optical axis. It is, for example, provided for that light entering the transparent body through the light entry face and, from the light tunnel, entering the passage section in the area of the bend, will exit from the light exit face essentially in parallel relative to the optical axis. It is, for example, provided for that light entering the transparent body through the light entry face, will exit from the light exit face essentially in parallel relative to the optical axis.

In a further embodiment of the invention, the bend includes an opening angle of at least 90°. In a further embodiment of the invention, the bend includes an opening angle of no more than 150°. In a further favourable embodiment of the invention, the bend is arranged on a surface of the light passage section, which surface is facing the light entry (sur)face.

In a further embodiment of the invention, the orthogonal of the light entry face is inclined with respect to the optical axis of the light passage section. In a further embodiment of the invention, the light entry face is inclined with respect to the optical axis of the light passage section by an angle of between 5° and 70°, for example by an angle of between 20° and 50°.

In a further embodiment of the invention, the light tunnel comprises a region on its surface which region corresponds essentially to at least 15% of the surface of an ellipsoid.

In a further embodiment of the invention, a surface of the light passage section facing the light tunnel is curved at least in the region of the bend towards the transition into the light tunnel, the curvature being, for example, convex. In a further embodiment of the invention, the bend is curved in its longitudinal extension. In a further embodiment of the invention, the bend is curved in its longitudinal extension, the bend having a radius of curvature of between 5 mm and 100 mm. In a still further embodiment of the invention, the bend is curved, in its longitudinal extension, corresponding to a Petzval curve.

In a further embodiment of the invention, the bend comprises, in its longitudinal extension, a curvature having a radius of curvature in the orientation of the optical axis of the light tunnel and/or of the light passage section. In a yet further preferred embodiment of the invention, the radius of curvature is orientated opposite to the light exit face.

In a further embodiment of the invention, the bend is curved in a first direction and in a second direction. In a further embodiment of the invention, the first direction is orthogonal to the second direction. In a still further embodiment of the invention, the bend is curved with a first radius of curvature in a first direction and with a second radius of curvature in a second direction, wherein the second radius of curvature is orthogonal with respect to the first radius of curvature.

In a further embodiment, a portion of the surface of the passage section facing the light tunnel is configured as a Petzval (sur)face. In a yet further embodiment of the invention the surface of the light passage section facing the light tunnel is, in a region in which it forms a transition into the light tunnel, configured as a Petzval face.

In a further embodiment of the invention the length of the headlight lens, when viewed in the orientation of the optical axis of the light tunnel and/or the light passage section, amounts to no more than 8 cm.

In a further embodiment of the invention the headlight lens or the transparent body, respectively, has a further light exit face as well as a further light entry face. In a further embodiment of the invention, at least 20% of the light entering the light entry face and exiting through the light exit face will exit through the light exit face after having exited from the monolithic body through the further light exit face and after having entered the monolithic body through the further light entry face. In a further embodiment of the invention, at least 10%, for example at least 20% of the light entering the light entry face and exiting through the light exit face will exit through the light exit face without having exited from the monolithic body through the further light exit face and without having entered the monolithic body through the further light entry face. In a further embodiment of the invention, at least 75% of the light entering the light entry face and exiting through the light exit face will exit through the light exit face after having exited from the monolithic body through the further light exit face and after having entered the monolithic body through the further light entry face. In a further embodiment of the invention, it is provided for that light entering the transparent body through the light entry face and entering the passage section from the light tunnel in the region of the bend will either exit from the monolithic body from the further light exit face and enter the further light entry face of the monolithic body as well as it will exit from the transparent body from the light exit face, or it will exit directly from the light exit face (without exiting from the monolithic body through the further light exit face and without entering the further light entry face of the monolithic body).

The aforementioned object is moreover achieved by a vehicle headlight, for example a motor vehicle headlight, wherein the vehicle headlight includes a headlight lens—comprising one or several of the aforementioned features—as well as a light source for making light enter the light entry face. In an embodiment of the invention, the light source comprises at least one LED or an array of LEDs. In an embodiment of the invention, the light source comprises at least one OLED or an array of OLEDs. For example, the light source may well be a plane or planar luminous field. The light source may also include light element chips as have been disclosed in DE 103 15 131 A1. A light source may as well be a laser. A suitable laser is disclosed in ISAL 2011 Proceedings, page 271ff.

In a further embodiment of the invention the vehicle headlight has no secondary optic associated with the headlight lens. A secondary optic, in the sense of the invention, is, for example, an optic means for aligning light which exits from the light exit face or from the last light exit face of the headlight lens, respectively. A secondary optic, in the sense of the invention, is for example an optical element for aligning light, said optical element being separated from and/or subordinated with regard to the headlight lens. A secondary optic, in the sense of the invention, is for example no cover or protection window, respectively, but an optical element provided for aligning light. An example of a secondary optic is e.g. a secondary lens as is disclosed in DE 10 2004 043 706 A1.

In particular, it is provided for that the bend which is imaged as bright-dark boundary lies in the lower region of the light tunnel.

In a yet further embodiment of the invention the distance of the light source from the centre of the first light exit face, when viewed in the orientation of the optical axis of the light tunnel and/or of the light passage section amounts to no more than 10 cm. In a further embodiment of the invention the length of the vehicle headlight, when viewed in the orientation of the optical axis of the light tunnel and/or of the light passage section amounts to no more than 10 cm.

One or several further light sources may be provided for, whose light is made to enter or irradiated into, respectively, the passage section and/or a part of the light tunnel, for implementing signlight, long distance light, and/or cornering headlight. When making such additional light enter the light tunnel, it is, in particular, provided for that this is performed in that half of the light tunnel which half is closer to the light passage section and/or in which half the light entry face has not been provided for.

One or several further light sources may be provided for whose light is made to enter or irradiated into, respectively, the passage section and/or a part of the light tunnel for implementing sign light, long distance light, and/or cornering light. When making such additional light enter the light tunnel it is, for example, provided for that this occurs in that half of the light tunnel which is closer to the light passage section and/or in which the light entry face is not arranged. For example, additional light source arrays may be provided for as are described or claimed, respectively, in WO 2012/072192 A1. For example, additional light source arrays are specified in FIGS. 10, 14, 15, 18, 19, 20, and 21 of WO 2012/072192 A1. For example, the headlight lens according to the invention may be used in arrays having optical axes inclined with respect to each other, as is disclosed (or claimed, respectively), for example, in WO 2012/072193 A2, particularly in FIG. 24 of WO 2012/072193 A2. Moreover, or alternatively, it may be provided for that the headlight lens will be made use of in vehicle configurations as are disclosed or claimed, respectively, in WO 2012/072191 A2.

In a further embodiment of the invention the light source and the (first)) light entry face are configured and associated with each other such that light from the light source enters the light entry face at a luminous flux density of at least 75 lm/mm$^2$.

The aforementioned headlight lenses may be manufactured in accordance with a process as is described in WO 2012/072188 A2.

It can be provided for that a light entry face, in the sense of the invention, and/or a light exit face, in the sense of the invention, will have a light dispersing structure. A light dispersing structure, in the sense of the invention, may, for example, be a structure as is disclosed in DE 10 2005 009 556 A1 and in EP 1 514 148 A1 or in EP 1 514 148 B1, respectively. It can be provided for that a light tunnel, in the sense of the invention, will be coated. It can be provided for that a light tunnel, in the sense of the invention, will be coated with a reflecting coating. It can be provided for that a mirroring coating is applied to a light tunnel in the sense of the invention. I A particularly press-molded, in particular monolithic body of transparent material, in the sense of the invention, is, particularly, dimensionally stable. A particularly press-molded, particularly monolithic body of transparent material, in the sense of the invention, is, in particular, not elastic/non-flexible.

In the sense of the invention, a motor vehicle is, in particular, a land vehicle for individual use in road traffic. In the sense of the invention, motor vehicles are, in particular, not restricted to land vehicles including a combustion engine.

DETAILED DESCRIPTION

Figure 1:
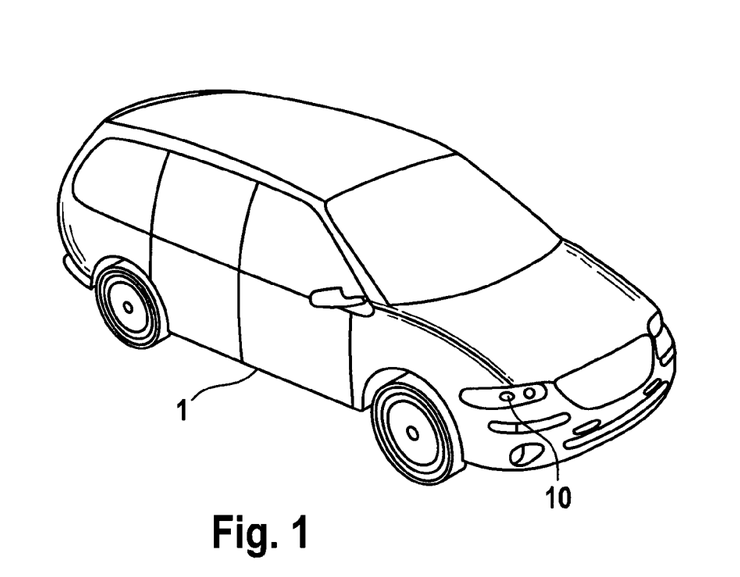
FIG. 1 shows an example of an embodiment of a motor vehicle.
Figure 2:
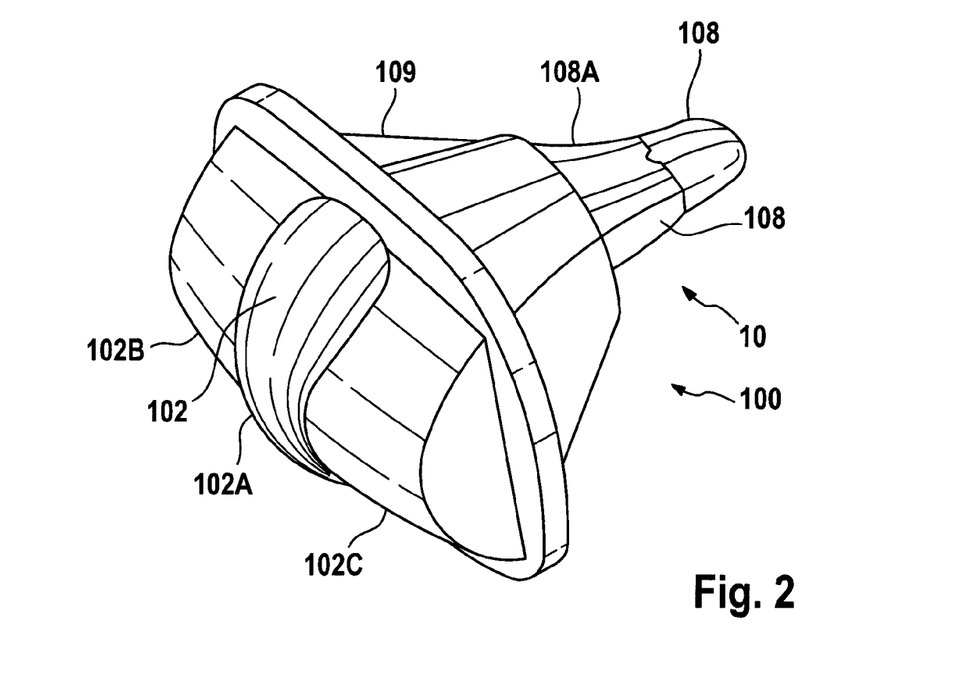
FIG. 2 shows an example of embodiment of a motor vehicle headlamp for implementation in the motor vehicle according to FIG. 1.

FIG. 1 shows an example of embodiment of a motor vehicle 1 having a motor vehicle headlight 10. FIG. 2 shows the motor vehicle headlight 10 including a headlight lens 100 by way of an inclined top view, but without any housing, fittings and energy supply, with the headlight lens 100 having been shown in FIG. 3 by way of a side view, however, also without any housing, fittings and energy supply. The headlight lens 100 comprises a press-molded monolithic body made from inorganic glass, in particular glass which comprises 0.2 to 2% by weight $Al_2O_3$,
0.1 to 1% by weight $Li_2O$,
0.3, in particular 0.4, to 1.5% by weight $Sb_2O_3$,
60 to 75% by weight $SiO_2$,
3 to 12% by weight $Na_2O$,
3 to 12% by weight $K_2O$, and
3 to 12% by weight $CaO$.

Figure 5:
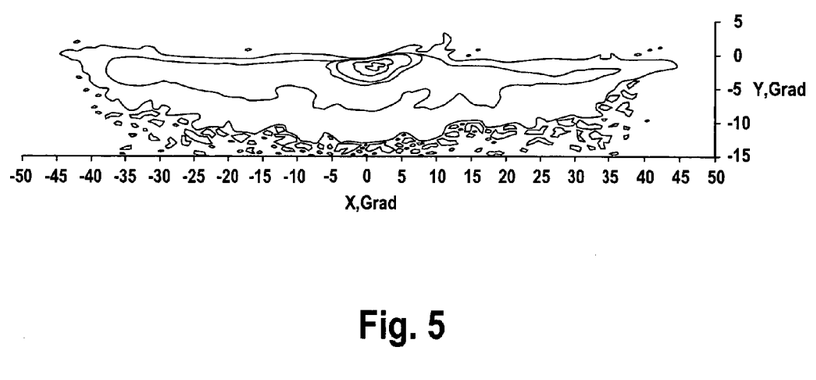
FIG. 5 shows a bright-dark boundary generated by means of the headlight lens according to FIG. 3

The bright-molded monolithic body comprises a light tunnel 108, which, on its one side, has a light entry face 101 and, on another side, transits into a light passage section 109 (of the bright- or press-molded monolithic body) via a bend 107 curved in two spatial directions, which section 109 has a segmented light exit face 102, whose segments have been designated by reference numerals 102 A, 102 B, and 102 C. The headlight lens 100 is configured such that light entering the headlight lens 100 through the light entry face 101 and, in the region of the bend 107, entering the light passage section from the light tunnel 108, will exit from the light exit face 102 essentially in parallel to the optical axis of the headlight lens 100. Herein, the light passage section 109 images the bend 107 as a bright-dark-boundary, as has been represented in FIG. 5, wherein, for implementing a dimmed light, by means of the light source 11 light is irradiated into or made to enter, respectively, the light entry face 101 of the light tunnel 108. The light tunnel 108 has a transition region 108 A, in which the surface restricting the light tunnel upwardly rises in the direction of the light passage section 109, and in which (transition region 108 A) the surface restricting the light tunnel 108 downwardly extents horizontally or in parallel, respectively, with respect to the optical axis of the headlight lens 100. The motor vehicle headlight 10 may be supplemented by further light sources, as disclosed in WO 2012/072188 A1 and WO 2012/072192 A1. Accordingly light can be irradiated into a bottom side of the light tunnel 108 or the portion 110 of the surface of the light passage section 109 facing the light tunnel 108, respectively, which latter portion is configured as a Petzval surface, which can be achieved, for example, by means of a light source— corresponding to the light source 12 as disclosed in WO 2012/072188 A1—selectively connectable for implementing a sign light or a high beam light[ii].

Figure 4:
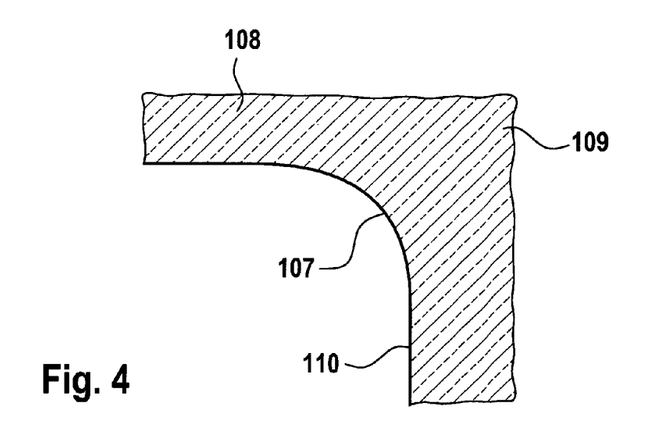
FIG. 4 shows an enlarged representation of a cut-out cross section of a bend for the transition of a light tunnel into a passage section of a headlight lens according to FIG. 3.

[ii] translator's remark: also termed upper beam, driving light, long distance light or main light FIG. 4 shows, by way of an enlarged representation, a cut-out of the bend 107 for transition of the light tunnel 108 into the light passage section 109, the bend 107 being formed by bright- or press-molding and configured as a continuous, curved transition.

Figure 6:
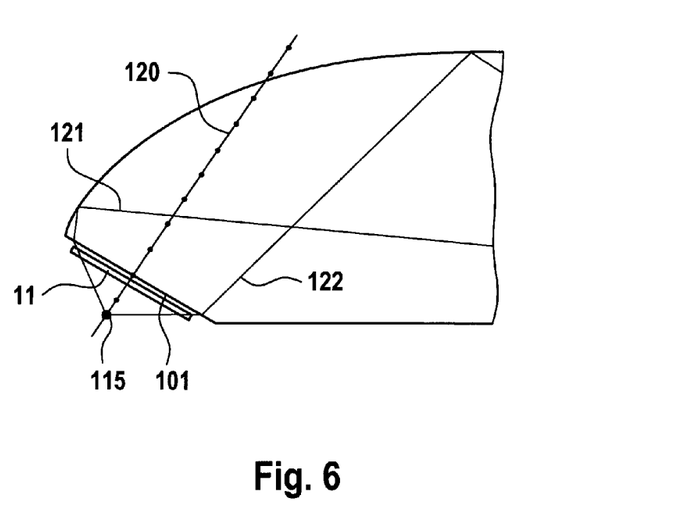
FIG. 6 shows a cut-out representation of a light tunnel of the headlight lens of FIG. 3 by way of a side view.

FIG. 6 shows an enlarged cut-out representation of a part of the light tunnel 108. The upper portion of the part of the light tunnel as shown in FIG. 6 is configured as an ellipsoid 150 as represented in FIG. 7. For illustrating this embodiment even more clearly, a part of the cross section of the light tunnel 108 is shown in FIG. 8 in a manner superimposing (overlaying) the representation of the ellipsoid 150. For the ellipsoid 150 as represented in FIG. 7 the following equation applies:

$$\frac{x^2}{a^2} + \frac{y^2}{b^2} + \frac{z^2}{c^2} - 1 = 0$$

In this equation z is a coordinate in the direction of the optical axis of the light tunnel (A→B);

x is a coordinate orthogonal with respect to the direction of the optical axis of the light tunnel; and y is a coordinate orthogonal with respect to the direction of the optical axis of the light tunnel and to the x-direction (D→C).

a, b, and, consequently, c have been chosen such that all light beams (or rays) which pass through focus F1 will concentrate and accumulate again in focus F2 after mirroring in the surface of the ellipsoid. The course of the beams of light from the light source 11, which light is irradiated into or made to enter, respectively, the light entry face 101 is illustrated by the light beams 121 and 122 depicted in FIG. 6. Reference numeral 120 of FIG. 6 designates the orthogonal of the light entry face 101. The mutual point of intersection of the orthogonal 120 of the light entry face 101 with the light beams 121 and 122 has been designated by reference numeral 115. The position of this point of intersection 115 corresponds to focus F1 in FIG. 7 and FIG. 8.

Figure 3:
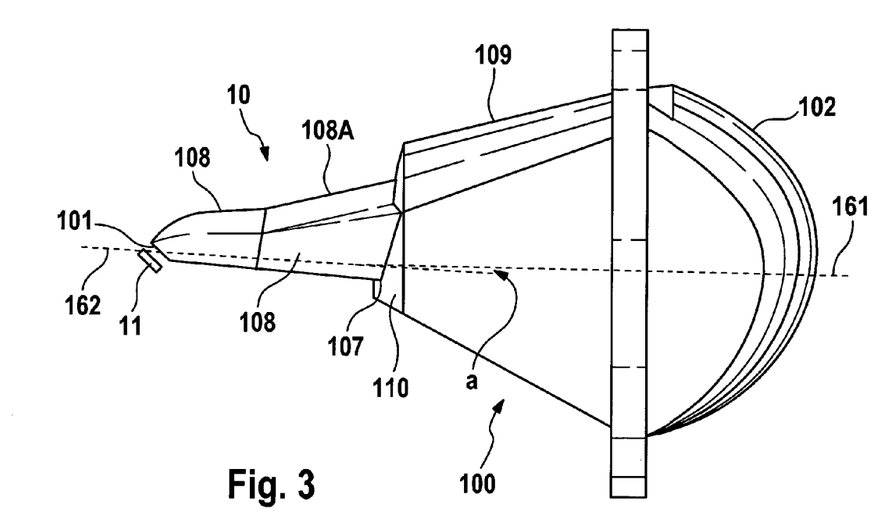
FIG. 3 shows the motor vehicle headlight according to FIG. 2 by way of a side view.

For increasing the light yield and efficiency, the headlight lens 100 is configured such that a (virtual) straight line designated by reference numeral 161 in FIG. 3 intersects a (virtual) straight line, designated by reference numeral 162 in FIG. 3, at an angle α, which angle, when viewed in clockwise direction starting from the first straight line amounts to 1° to 10°, optionally to 3° to 7°, for example to 5°, wherein the straight line 161 is the optical axis or an optical axis, respectively, of the light passage section 109 and/or the optical axis or an optical axis, respectively, of the light exit face 102 and/or the projection of the optical axis or an optical axis, respectively, of the light and passage section 109 onto the vertical plane and/or the projection of the optical axis or an optical axis, respectively of the light exit face 102 onto the vertical plane, and wherein the second straight line 162 is the optical axis or an optical axis, respectively, of the light tunnel 108 and/or a straight line through the two focal points F1 and F2 of the ellipsoid 150 and/or the projection of the optical axis or an optical axis, respectively, of the light tunnel 108 onto the vertical plane and/or the projection of a straight line through the two focal points F1 and F2 of the ellipsoid 150 onto the vertical plane.

The headlight lens 100 is, herein or thereby, respectively, configured such that the radiant flux of such light, which enters the headlight lens 100 through the light entry face 101 and exits therefrom through the light exit face 102, amounts to roughly 90% of the radiant flux of light entering the headlight lens 100 through the light entry face 101.

In the Figures, the elements, the spacings, distances and gaps, respectively, and the angles are plotted in consideration of simplicity and clearness and not necessarily drawn to scale. Thus, for example, the orders of magnitude of some of the elements, the spacings, distances and gaps, respectively, and the angles are exaggerated with respect to other ones of elements, spacings, distances and gaps, respectively, and angles in order to enhance comprehension of the examples of embodiment of the present invention.

The invention claimed is:

1. A headlight lens for a vehicle headlight, the headlight lens including a body of transparent material, the body comprising:

at least one light entry face at least one optically effective light exit face, a light passage section, and a light tunnel which, via a bend, transits into the light passage section configured for imaging the bend as a bright-dark-boundary, wherein the radiant flux of light which enters the headlight lens through the light entry face and exits from the light exit face for imaging the bend as a bright-dark-boundary amounts to at least 88% of the radiant flux of the light which enters the headlight lens through the light entry face, wherein the light tunnel is arranged between the bend and the light entry face, wherein the light passage section is arranged between the bend and the light exit face, wherein a first straight line intersects a second straight line by an angle, which angle, when viewing the headlight lens such that the light passage section lies to the right of the light tunnel, amounts to 1° to 10° seen in a clockwise sense starting from the first straight line, wherein the first straight line is one of the group consisting of an optical axis of the light passage section, an optical axis of the light exit face, a projection of the optical axis of the light and passage section onto a vertical plane, and a projection of the optical axis of the light exit face onto the vertical plane, and wherein the second straight line is one of the group consisting of an optical axis of the light tunnel, and a projection of the optical axis of the light tunnel onto the vertical plane.

2. The headlight lens as claimed in claim 1, wherein the first straight line is the optical axis of the light exit face, and wherein the second straight line is an optical axis of the light tunnel.

3. The headlight lens as claimed in claim 1, wherein the first straight line is the optical axis of the light passage section, and wherein the second straight line is an optical axis of the light tunnel.

4. The headlight lens as claimed in claim 3, wherein, the light entry face is inclined with respect to the optical axis of the light passage section by an angle of between 5° and 70°.

5. The headlight lens as claimed in claim 3, wherein, the light entry face is inclined with respect to the optical axis of the light passage section by an angle of between 20° and 50°.

6. The headlight lens as claimed in claim 1, wherein the first straight line is the projection of the optical axis of the light exit face onto the vertical plane, and wherein the second straight line is a projection of the optical axis of the light tunnel onto the vertical plane.

7. The headlight lens as claimed in claim 6, wherein the body of transparent material is monolithic.

8. The headlight lens as claimed in claim 6, the bend being a curved transition having a radius of curvature of no less than 50 nm and no more than 0.25 mm.

9. The headlight lens as claimed in claim 6, the bend being a curved transition having a radius of curvature of at least 0.05 mm.

10. The headlight lens as claimed in claim 6, wherein the light tunnel is not flexible.

11. The headlight lens as claimed in claim 1, wherein the light exit face comprises at least two segments, which are separated from each other by means of one of the group consisting of an indentation, a notch, and a discontinuity.

12. The headlight lens as claimed in claim 1, wherein the point of intersection of the first straight line with the second straight line is provided for in the transition from the light tunnel to the light passage section.

13. The headlight lens as claimed in claim 1, wherein the light exit face comprises at least two segments, which are separated from each other by means of an indentation.

14. A headlight lens for a vehicle headlight, the headlight lens including a body of transparent material, the body comprising:
    at least one light entry face
    at least one optically effective light exit face,
    a light passage section, and
    a light tunnel which, via a bend, transits into the light passage section configured for imaging the bend as a bright-dark-boundary, wherein the light tunnel comprises an area on its surface which essentially corresponds to part of the surface of an ellipsoid,
    wherein the radiant flux of the light which enters the headlight lens through the light entry face and exits from the light exit face for imaging the bend as a bright-dark-boundary amounts to at least 88% of radiant flux of the light which enters the headlight lens through the light entry face
    wherein the light tunnel is arranged between the bend and the light entry face,
    wherein the light passage section is arranged between the bend and the light exit face,
    wherein a first straight line intersects a second straight line by an angle, which angle, when viewing the headlight lens such that the light passage section lies to the right of the light tunnel, amounts to 1° to 10° seen in a clockwise sense starting from the first straight line,
    wherein the first straight line is one of the group consisting of
        an optical axis of the light passage section,
        an optical axis of the light exit face,
        a projection of the optical axis of the light and passage section onto a vertical plane and
        a projection of the optical axis of the light exit face onto the vertical plane, and
    wherein the second straight line is one of the group consisting of
        a straight line through the two focal points of the ellipsoid and
        a projection of the straight line through the two focal points of the ellipsoid onto the vertical plane.

15. The headlight lens as claimed in claim 14, wherein light tunnel is arranged between the bend and the light entry face, and wherein the light passage section is arranged between the bend and the light exit face.

16. The headlight lens as claimed in claim 15, wherein the first straight line is the optical axis of the light exit face, and wherein the second straight line is the straight line through the two focal points of the ellipsoid.

17. The headlight lens as claimed in claim 15, wherein the first straight line is the projection of the optical axis of the light exit face onto the vertical plane, and wherein the second straight line is the projection of the straight line through the two focal points of the ellipsoid onto the vertical plane.

18. The headlight lens as claimed in claim 17, wherein, the light entry face is inclined with respect to the optical axis of the light passage section by an angle of between 5° and 70°.

19. The headlight lens as claimed in claim 18, wherein the body of transparent material is monolithic.

20. The headlight lens as claimed in claim 19, the bend being a curved transition having a radius of curvature of at least 0.05 mm.

21. The headlight lens as claimed in claim 18, the bend being a curved transition having a radius of curvature of no less than 50 nm and no more than 0.25 mm.

22. The headlight lens as claimed in claim 21, wherein the light exit face comprises at least two segments, which are separated from each other.

23. The headlight lens as claimed in claim 21, wherein the light tunnel comprises an area on its surface which essentially corresponds to at least 15% of the surface of an ellipsoid.

24. The headlight lens as claimed in claim 15, wherein the point of intersection of the first straight line with the second straight line is provided for in the transition from the light tunnel to the light passage section.

25. A headlight lens for a vehicle headlight, the headlight lens including a body of transparent material, the body comprising:
    at least one light entry face
    at least one optically effective light exit face,
    a light passage section, and
    a light tunnel which, via a bend, transits into the light passage section configured for imaging the bend as a bright-dark-boundary, wherein the light tunnel comprises an area on its surface which essentially corresponds to part of the surface of an ellipsoid, wherein the light tunnel is arranged between the bend and the light entry face,
    wherein the light passage section is arranged between the bend and the light exit face, and
    wherein the radiant flux of the light which enters the headlight lens through the light entry face and exits from the light exit face amounts to at least 88% of the radiant flux of the light which enters the headlight lens through the light entry face.

26. The headlight lens as claimed in claim 25, wherein, the light entry face is inclined with respect to the optical axis of the light passage section by an angle of between 5° and 70°.

27. The headlight lens as claimed in claim 25, wherein, the light entry face is inclined with respect to the optical axis of the light passage section by an angle of between 20° and 50°.

28. The headlight lens as claimed in claim 25, wherein the body of transparent material is monolithic.

29. The headlight lens as claimed in claim 25, the bend being a curved transition having a radius of curvature of no less than 50 nm and no more than 0.25 mm.

30. The headlight lens as claimed in claim 25, the bend being a curved transition having a radius of curvature of at least 0.05 mm.

31. The headlight lens as claimed in claim 25, wherein the light tunnel is not flexible.

32. The headlight lens as claimed in claim 25, wherein the light exit face comprises at least two segments, which are separated from each other by means of one of the group consisting of an indentation, a notch, and a discontinuity.

33. The headlight lens as claimed in claim 30, wherein the light exit face comprises at least two segments, which are separated from each other by means of one of the group consisting of an indentation, a notch, and a discontinuity.

34. The headlight lens as claimed in claim 33, wherein the light exit face comprises at least two segments, which are separated from each other by means of an indentation.

* * * * *